(12) United States Patent
Castner et al.

(10) Patent No.: US 8,662,125 B2
(45) Date of Patent: *Mar. 4, 2014

(54) MODIFIED GEL PARTICLES AND RUBBER COMPOSITION

(75) Inventors: Eric Sean Castner, Uniontown, OH (US); Lei Zheng, Apex, NC (US); Feng Anne Xie, Stow, OH (US); Ping Zhang, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/903,514

(22) Filed: Oct. 13, 2010

(65) Prior Publication Data

US 2011/0024011 A1 Feb. 3, 2011

Related U.S. Application Data

(62) Division of application No. 10/999,406, filed on Nov. 30, 2004, now Pat. No. 7,838,112.

(51) Int. Cl.
*B60C 11/00* (2006.01)
*C08L 9/00* (2006.01)

(52) U.S. Cl.
USPC .................. 152/209.5; 525/232; 525/241

(58) Field of Classification Search
USPC ........... 152/209.5; 525/71, 98, 316, 232, 313, 525/314, 241, 332.2, 69, 332.9, 333.3
See application file for complete search history.

(56) References Cited

U.S. PATENT DOCUMENTS

| | | | | |
|---|---|---|---|---|
| 5,395,891 A | 3/1995 | Obrecht et al. | | 525/194 |
| 5,409,967 A | 4/1995 | Carson et al. | | 523/201 |
| 5,686,528 A | 11/1997 | Wills et al. | | 525/68 |
| 6,058,994 A * | 5/2000 | Amino et al. | | 152/167 |
| 6,127,488 A | 10/2000 | Obrecht et al. | | 525/333.3 |
| 6,130,290 A | 10/2000 | Troy et al. | | 525/63 |
| 6,133,364 A | 10/2000 | Obrecht et al. | | 524/495 |
| 6,207,757 B1 | 3/2001 | Obrecht et al. | | 525/194 |
| 6,242,534 B1 | 6/2001 | Obrecht et al. | | 525/191 |
| 6,248,807 B1 | 6/2001 | Sosa et al. | | 523/201 |
| 6,316,527 B1 | 11/2001 | Meyer et al. | | 523/201 |
| 6,395,829 B1 * | 5/2002 | Miyamoto et al. | | 525/71 |
| 6,489,378 B1 | 12/2002 | Sosa et al. | | 523/201 |
| 6,620,866 B1 | 9/2003 | Obrecht et al. | | 524/81 |
| 6,653,404 B2 | 11/2003 | Konno et al. | | 525/84 |
| 6,747,095 B2 | 6/2004 | Konno et al. | | 525/89 |
| 6,777,500 B2 * | 8/2004 | Lean et al. | | 525/316 |
| 7,408,005 B2 | 8/2008 | Zheng et al. | | 525/63 |

FOREIGN PATENT DOCUMENTS

| | | | |
|---|---|---|---|
| EP | 0265142 A | 4/1988 | |
| EP | 0536934 A | 4/1993 | |
| EP | 0953583 A | 11/1999 | |
| JP | 06128339 A | 8/1994 | |

* cited by examiner

*Primary Examiner* — James J Seidleck
*Assistant Examiner* — S. Camilla Pourbohloul
(74) *Attorney, Agent, or Firm* — Alvin T. Rockhill

(57) ABSTRACT

This invention discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (1) a filler, (2) a cured rubbery polymer, and (3) core-shell particles which are comprised of (a) a crosslinked elastomeric core consisting essentially of repeat units that are derived from at least one conjugated diolefin monomer and from 15 weight percent to 30 weight percent at least one crosslinking monomer, wherein the crosslinked elastomeric core is a polymeric composition having a glass transition temperature which is within the range of −20° C. to 20° C., and (b) a polymeric shell which is derived from at least one vinyl aromatic monomer, wherein the polymeric shell has a glass transition temperature which is within the range of 50° C. to 160° C., and wherein the weight ratio of the core to the shell is within the range of 20:1 to 7:1.

17 Claims, No Drawings

MODIFIED GEL PARTICLES AND RUBBER COMPOSITION

This is a divisional and a continuation-in-part application of U.S. patent application Ser. No. 10/999,406 filed on Nov. 30, 2004. The teachings of U.S. patent application Ser. No. 10/999,406 and U.S. patent application Ser. No. 11/391,596 (now issued as U.S. Pat. No. 7,645,511) are incorporated herein by reference in their entirety.

BACKGROUND OF THE INVENTION

Particles of various types are commonly incorporated into rubber compositions as fillers. For instance, fillers are typically included in the rubber compositions utilized in manufacturing tires, hoses, belts, windshield wiper blades, floor mats, and other rubber products. The fillers are chosen to enhance certain physical characteristics of the rubber composition. Especially in tire art, the use of carbon black, silica, and crosslinked polymers as fillers is well known. The addition of fillers tends to improve the physical properties of the polymer matrices to which they are added. For instance, the inclusion of carbon black and silica in tire tread rubber compounds is critical to attain required strength and tread wear characteristics. However, such tires have the disadvantage that they have a high rolling resistance, which is related to hysteresis loss. With the increasing demand for automobile safety and low fuel consumption, the specifications for tire tread elastomeric compounds have become more critical. Tire treads are expected to have high abrasion resistance in order to provide a long life expectancy, to exhibit good anti-skid properties in both wet and dry conditions, and to have low hysteresis characteristics at elevated temperatures in order to provide low rolling resistance and reduced dynamic heat build-up. Therefore, numerous attempts have been made in the design of both elastomer matrices and fillers.

U.S. Pat. No. 5,395,891 and U.S. Pat. No. 6,127,488 to Obrecht disclose the use of crosslinked polybutadiene and crosslinked styrene-butadiene copolymers, respectively, as fillers. The purported benefit of the inclusion of these crosslinked rubber particles in rubber formulations is lower hysteresis. Additionally, polybutadiene gels have been shown to impart improved abrasion resistance while styrene-butadiene copolymer gels have demonstrated improved wet traction characteristics. U.S. Pat. No. 6,133,364, U.S. Pat. No. 6,207,757, and U.S. Pat. No. 6,242,534 to Obrecht et al disclose a rubber composition comprising a crosslinked elastomer particle and a non-crosslinked elastomer. The crosslinked elastomeric particles are functionalized to impart unique surface reactivity for improved coupling with the non-crosslinked host elastomer as well as the subsequent ability to employ coupling agents other than the conventional sulfur-bridged bis-alkoxy silanes. The benefits of these gels in tire tread compositions are reported to be lower hysteresis, improved abrasion resistance, and improved wet traction. However, using these gel particles as fillers shows some critical drawbacks such as inferior mechanical properties (e.g. 300% moduli, tear and abrasion resistance). U.S. Pat. No. 6,620,866 discloses a rubber mixture containing agglomerated rubber gels. The purpose of using the high-pressure agglomerated gels is to improve the recognized deficiency in the mechanical properties.

U.S. Pat. No. 6,747,095 and U.S. Pat. No. 6,653,404 to Konno et al disclose a rubber composition comprising as essential components a crosslinked polymer particle and a non-crosslinked rubber component. The rubber composition may be used to obtain a vulcanized rubber. The crosslinked polymer particles are intended for use as filler to provide a rubber composition having good processability and handling performance as well as improved tensile strength and wear resistance when vulcanized.

SUMMARY OF THE INVENTION

The present invention relates to core-shell type emulsion polymer particles and methods for preparing them. The core-shell polymer particle is comprised of a crosslinked elastomeric center portion (core) and an exterior portion (shell) which has a composition that is sufficiently different from the core. The core-shell polymer particles can be prepared with a controlled structure and size. The function of the crosslinked core is to provide a discrete polymer phase having a glass transition temperature which imparts better wet traction and lower rolling resistance. The advantage over the prior art is the inclusion of a vinyl aromatic-rich shell to the core. This modification has been found to impart improved mechanical and tear properties of a rubbery composite compared to the crosslinked elastomeric core alone. Specifically the present invention relates to mixtures of rubbers containing crosslinked elastomeric particles (diolefins and copolymers consisting of vinyl aromatic monomers and diolefins) grafted with a vinyl aromatic polymer or copolymer of vinyl aromatic monomers and diolefins, which can form a core-shell type structure. The particles are generally described to be composed of a crosslinked elastomeric core and a shell, where the shell is covalently connected to the core. The crosslinked elastomeric core may be designed to have a composition which provides high damping in a particular temperature range so as to impart improved wet traction, and usually low damping at higher temperatures, for improved rolling resistance. The advantage of the current invention is that the vinyl aromatic-rich shell reinforces the crosslinked elastomeric core, which enhances mechanical properties, e.g., high elastic modulus. In addition, the vinyl aromatic-rich shell is believed to increase the interactions between the particles to obtain better tear resistance.

The core-shell particles of polystyrene and polybutadiene are disclosed in U.S. Pat. No. 6,777,500. The shell is grafted onto the core through linkage with residual unreacted vinyl groups carried in the core. The core-shell particle comprises a crosslinked polymer core where the crosslinked polymer core has a predetermined glass transition temperature ($T_g$) such that the crosslinked polymer core does not soften at service temperatures up to about 150° C.

The core-shell particle is also disclosed as a "hairy particle" as described in U.S. Provisional Patent Application Ser. No. 60/552,617, filed on Mar. 12, 2004. The hairy polymer particles can be synthesized by first making a core polymer by emulsion polymerization. After being dried, the core polymer is reacted with an organo-lithium compound to make a hairless core initiator. The hairless core initiator can then be used to initiate the anionic polymerization of conjugated diolefin monomers to produce the hairy polymer particles of this invention. The final structured core-shell particle has a crosslinked core and a shell containing linear polymer brushes.

Core-shell particles are widely used for rubber toughened plastics and adhesives. Core-shell morphologies from polybutadiene-polystyrene graft copolymers are taught by U.S. Pat. No. 6,248,419 and U.S. Pat. No. 6,489,378 to Sosa et al. But, the teaching is directed to production of high impact polystyrene using graft copolymer particles having a polystyrene core occluded inside a polybutadiene shell and the particles have an average particle size of about 0.5 microns. U.S. Pat.

No. 5,686,528 by Wills et al disclosed high-impact poly(styrene) resins modified with small particle size below 250 nm, multi-stage impact modifiers having a crosslinked poly(butadiene) core and a poly(styrene) or other vinyl-aromatic polymer shell. The additive polymer is useful in improving the balance of impact strength and other physical properties such as gloss, stiffness and resistance to environmental stress crazing when blending with thermoplastics.

The present invention is the result of the discovery that crosslinked elastomeric polymer particles (diolefins, and copolymers consisting of vinyl aromatic monomers and diolefins) can be augmented by a vinyl aromatic-rich shell, and the resulting modified, crosslinked elastomeric polymer particles can be used as fillers to provide enhanced mechanical and dynamical properties of rubber composites. The vinyl aromatic-rich shell has a composition which is sufficiently different from the crosslinked elastomeric core that the particle assumes a core-shell type structure.

The core and the shell can be varied depending upon the desired properties and use of the particles. The core and shell may be comprised of diolefins and vinyl aromatics monomers or mixtures thereof. The core can be crosslinked using a multi-functional monomer. The core may also be crosslinked when diene monomers are used and the reaction is allowed to proceed to high conversion. The shell can be grafted onto the core through linkages with residual unreacted double bonds carried in the core. The volume fraction of the core and shell can be varied depending upon the desired final properties of the particles. The shell composition can be chosen to provide compatibility or incompatibility with the matrix composition. The core-shell particle may comprise a crosslinked polymer core where the crosslinked polymer core has a predetermined glass transition temperature ($T_g$) such that the crosslinked rubber gels provide improved wet traction.

The particles are synthesized by emulsion polymerization which can be a batch, semi-batch, or continuous process, but which provides control of the polymer composition and morphology. The process produces particles having a mean average diameter of less than 200 nm, preferably less than about 100 nm. The core-shell particles are useful as fillers in polymer compositions and the particles of the present invention provide enhanced properties for the polymer compositions.

The subject invention more specifically discloses a core-shell type particle which is comprised of (1) a crosslinked elastomeric core comprised of repeat units that are derived from at least one diolefin monomer and optionally one or more vinyl aromatic monomer, and (2) a polymeric shell which is derived from at least one vinyl aromatic monomer.

The subject invention further discloses a process for synthesizing a modified crosslinked elastomeric particle which comprises a two-step polymerization of a conjugated diolefin monomer and a vinyl aromatic monomer by emulsion polymerization, wherein the particle is synthesized by the steps of (1) polymerizing a conjugated diolefin monomer, alone or in combination with a vinyl aromatic monomer, and optionally a crosslinking monomer, to create a crosslinked elastomeric core having residual double bonds and an outer surface; (2) polymerizing a monomer of a vinyl aromatic monomer, alone or in combination with a diolefin monomer, to create a polymeric shell, wherein the polymeric shell is grafted to the outer surface of the polymeric core by reacting with the residual double bonds of the polymeric core; and (3) coagulating the core-shell emulsion latex solution to recover the particles.

The present invention further reveals a rubber composition which is comprised of a rubbery polymer and a core-shell polymer particle, wherein the core-shell polymer particle is comprised of (1) a core which is comprised of a polymer of a diolefin monomer and (2) a shell which is comprised of a vinyl aromatic monomer, wherein the shell is covalently bonded to the core.

The subject invention also discloses a process for making a rubber composition containing a core-shell polymer which comprises the steps of (1) polymerizing a conjugated diolefin monomer, alone or in combination with a vinyl aromatic monomer, and optionally a crosslinking monomer, to create a polymeric core having residual double bonds and an outer surface; (2) polymerizing a vinyl aromatic monomer, alone or in combination with a diolefin monomer, to create a polymeric shell, wherein the polymeric shell is grafted covalently to the outer surface of the polymeric core to produce a latex of the core-shell polymer; (3) blending the latex of the core-shell polymer with a latex of a rubbery polymer to produce a latex blend, and (4) coagulating the latex blend to recover the rubber composition.

The present invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (1) a filler, (2) a rubbery polymer, and (3) core-shell particles that are comprised of (a) a crosslinked elastomeric core comprised of repeat units that are derived from at least one diolefin monomer and optionally one or more vinyl aromatic monomer, and (b) a polymeric shell which is derived from at least one vinyl aromatic monomer.

DETAILED DESCRIPTION OF THE INVENTION

The modified gel particles of this invention are synthesized by emulsion polymerization in the following steps: (1) polymerizing to high conversion a conjugated diolefin monomer, alone or in combination with a vinyl aromatic monomer, and optionally a crosslinking monomer, to create an unsaturated, crosslinked polymeric core. Upon obtaining a high conversion of the first monomer charge, a vinyl aromatic monomer, alone or in combination with a diolefin monomer is added to the reaction mixture and the entire monomer charge is taken to full conversion to create a polymer composition at the exterior of the particle which is sufficiently different from the crosslinked elastomeric core to produce a shell-type structure, preferably wherein the polymeric shell is grafted covalently to the outer surface of the polymeric core. The intent of using a vinyl aromatic monomer alone or in combination with a diolefin monomer is to modify the properties of the crosslinked elastomeric core.

A glass transition temperature of −20° C. to 20° C. is preferred for the crosslinked elastomeric core with the shall having a glass transition temperature of 20° C. or above. It is important for the core polymer to have a glass transition temperature within the range of −20° C. to 20° C. to attain high traction characteristics when used in tire tread compounds. The shell will typically be comprised of a polymer having a glass transition temperature that is within the range of 50° C. to 160° C. When the crosslinked elastomeric core and the shell are incompatible with each other, phase separation occurs with the result being a core-shell type structure. The glass transition temperature of the polymer making up the shell will accordingly differ from that of the core by at least 30° C., preferably at least 50° C., and most preferably at least 70° C. It is desirable for this difference in glass transition temperatures to be as great as possible to attain lower rolling resistance when utilized in tire tread compounds.

The weight ratio of the polymer comprising the core to polymer comprising the shell will typically be within the range of 20:1 to 1:1. The weight ratio of the core to the shell will more typically be within the range of 15:1 to 7:1 and will preferably be within the range of 12:1 to 8:1. Accordingly, in synthesizing the core-shell polymer the weight ratio of the monomer charge used in making the core to the monomer charged used in making the shell will typically be within the range of 20:1 to 1:1, will more typically be within the range of 15:1 to 7:1, and will preferably be within the range of 12:1 to 8:1.

The crosslinked elastomeric polymer core and the vinyl aromatic containing shell are synthesized by the emulsion polymerization of vinyl aromatic monomers, and optionally, conjugated diolefin monomers. Generally, any vinyl aromatic monomer which is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, α-methylstyrene, 4-phenylstyrene, 3-methylstyrene and the like. The conjugated diolefin monomers that can optionally be included in synthesizing the core polymer typically contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in mixture. The choice of monomers and ratio of vinyl aromatic monomers to conjugated diolefin monomer used in making the core polymer will depend upon the properties desired for the polymer particles being made. However, the shell polymer will normally be comprised of at least 75 weight percent vinyl aromatic monomers and will more typically be comprised of at least 80 weight percent vinyl aromatic monomers. It is normally preferred for the shell to be comprised of at least 90 weight percent vinyl aromatic monomers and can be made entirely of vinyl aromatic monomers.

The core particles will typically be crosslinked using a crosslinking monomer unit such as divinyl benzene, diisopropenylbenzene, or 1,2-polybutadiene. The crosslinking monomer will typically be incorporated at a level which is within the range of 0% to about 100%, preferably about 10% to about 30%, and most preferably 15% to 25% by weight based upon the weight of the polymer. In some case it is desirable to crosslink the polymeric core to a higher level utilizing from 20% to 30% of the crosslinking monomer based upon the weight of the polymer. Crosslinking the particle can increase the hardness of the core, as well as glass transition temperature of the nanoparticle.

The emulsion polymerization is conducted as a batch, semi-continuous, or continuous operation. Essentially any type of free radical generator can be used to initiate the free radical emulsion polymerization. For example, free radical generating chemical compounds, ultra-violet light or radiation can be used. In order to ensure a satisfactory polymerization rate, uniformity and a controllable polymerization, free radical generating chemical agents which are water-soluble or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in such aqueous emulsion polymerizations.

The core and shell polymers of this invention can also be synthesized with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisisobutyronitrile (AIBN), are preferred for use in generating free radicals.

The amount of free radical initiator employed will vary with the desired molecular weight of the core particle being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. A chain transfer agent, such as t-dodecyl mercaptan, can optionally be used to reduce the molecular weight of the polymer synthesized during the emulsion polymerization used to make the polymeric core. For instance, the molecular weight of the core polymer reduces with increasing levels of chain transfer agent. However, it is not necessary to utilize a chain transfer agent in the synthesis of the core polymer.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

The soap systems used in the emulsion polymerization process will frequently contain a combination of rosin acid and fatty acid emulsifiers. The weight ratio of fatty acid soaps to rosin acid soaps will typically be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is typically charged into the first polymerization zone. The total amount of soap employed will normally be less than 5 phm. The quantity of soap employed will normally be within the range of about 1 phm to 4 phm. It is typically preferred to utilize a level of soap which is within the range of about 2 phm to about 3.0 phm. The precise amount of the soap system required in order to attain optimal results will, of course, vary with the specific soap system being used. However, persons skilled in the art will be able to easily ascertain the specific amount of soap system required in order to attain optimal results.

After the polymerization has been terminated, the core-shell polymer is recovered from the aqueous medium. This can be accomplished by coagulating the latex and recovering the core-shell polymer from the aqueous medium. The coagulation can be accomplished by adding an acid or preferably a combination of salts and an acid to the emulsion. Following the initial coagulation, the core polymer may be washed one or multiple times with water.

The core-shell particles can be incorporated in a non-crosslinked host or matrix polymer where the non-crosslinked host polymer can be a polymer having only conjugated diene repeat units, a polymer having repeat units of a conjugated diene unit and an aromatic vinyl unit, a polymer having repeat units of a conjugated diene unit and an $\alpha,\beta$-unsaturated nitrile unit, an acrylic rubber, a polymer having repeat units of an ethylene unit, and polymers having repeat units having functional groups able to interact with at least one functional group of the hairy polymer particles. Thus, the particles of the present invention are suitable for incorporation in and modifying a variety of rubbers, including, but not limited to, random styrene-butadiene rubber (SBR) polybutadiene rubber, synthetic polyisoprene rubber, nitrile rubber, polyurethane, butyl rubber, EPDM, natural rubber, and the like.

The particles of this invention will typically be incorporated in rubbery polymers at a level which is within the range of about 5 phr (parts by weight per 100 parts by weight of the rubber) to about 100 phr. The particles will more typically be utilized at levels which are within the range of 10 phr to 60 phr. The polymer particles of this invention can be used in conjunction with conventional rubber compounding chemicals and in conjunction with conventional fillers, such as carbon black, silica, and/or starch.

In one embodiment of this invention, the polymeric nanoparticles are incorporated into rubbery polymers by a technique that involves (1) blending the solution of the hairy polymer particles made by the process of this invention with the cement of a rubbery polymer to produce a cement blend, and (2) coagulating the cement blend to recover the rubber composition. The utilization of this technique can further improve the level of incorporation and interaction between the nanoparticles and the rubbery polymer. This can accordingly further improve the physical properties of the rubber composition.

The core-shell polymer particles of the present invention can be used alone or in combination with other elastomers to prepare rubber compounds, such as a tire treadstock, sidewall stock or other tire component stock compounds. In a tire of the invention, at least one such component is produced from a vulcanizable elastomeric or rubbery composition. For example, the core-shell polymer particles made by the process of this invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. In making tire tread compounds the core-shell polymer particles will typically be blended with at least one rubbery polymer including natural rubber, polybutadiene rubber, styrene-butadiene rubber, synthetic polyisoprene rubber (including 3,4-polyisoprene), isoprene-butadiene rubber, and styrene-isoprene-butadiene rubber. The core-shell polymer particles will typically be blended into the rubbery polymer at a level of 1 phr (parts by weight per 100 parts by weight of rubber) to 50 phr. More typically the core-shell polymer particles will be blended into the rubbery polymer at a level of 10 phr to 40 phr and will preferable be included at a level of 20 phr to 30 phr.

The tire tread compounds made with the core-shell particles of this invention can be compounded with carbon black, silica, starch and/or other fillers in amounts ranging from about 5 to about 100 phr (parts by weight per 100 parts by weight of rubber), with about 5 to about 80 phr being preferred, and with about 40 to about 70 phr being more preferred. The carbon blacks may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the acetyltri-methyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| Carbon Black | |
|---|---|
| ASTM Designation (D-1765-82a) | Surface Area (D-3765) |
| N-110 | 126 $m^2/g$ |
| N-220 | 111 $m^2/g$ |
| N-330 | 83 $m^2/g$ |
| N-339 | 95 $m^2/g$ |
| N-550 | 42 $m^2/g$ |
| N-660 | 35 $m^2/g$ |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of suitable vulcanizing agents one can refer to Kirk-Othmer, Encyclopedia of Chemical Technology, 3rd ed., Wiley Interscience, N.Y. 1982, Vol. 20, pp. 365-468, particularly "Vulcanization Agents and Auxiliary Materials" pp. 390-402. Vulcanizing agents can, of curse, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

This invention is illustrated by the following examples that are merely for the purpose of illustration and are not to be regarded as limiting the scope of the invention or the manner in which it can be practiced. Unless specifically indicated otherwise, parts and percentages are given by weight.

Example I

Preparation of Polystyrene Reinforced Polyisoprene Gels

PI-PS Core-Shell, Particle A

A 10 gallon (38 liter) reactor equipped with two axial flow turbines operating at 220 rpm was evacuated for 30 minutes and then charged with a soap solution composed of 41.1 lbs (18.6 kg) of reverse osmosis (RO) water, 25.3 grams or tripotassium phosphate, 6.33 lbs (2.87 kg) of a 10% solution of $C_{14}$-$C_{18}$ unsaturated fatty acid potassium salt, 239 grams of a 20% solution of the potassium salt of disproportionated rosin acid, 52.3 grams of a 47.5% active dispersion of sodium naphthalenesulfonate-formaldehyde. The pH of the soap solution was adjusted to 10.5-11.0 with a 20% potassium hydroxide solution.

To the reactor was added an activator solution composed of 440 grams of RO water, 12.9 grams of hydroxymethane-sulfinic acid monosodium salt dihydrate, and 3.79 grams of ethylenediaminetetraacetic acid, ferric sodium complex. Then, 17.64 lbs (8.0 kg) of isoprene and 6.61 lbs (3.0 kg) of 55% divinyl benzene were added to the reactor. The reactor was cooled to a temperature of 10° C. (50° F.). When the contents of the reactor reached 10° C. (50° F.), 30.0 grams of a 55% active pinane hydroperoxide was added. The reaction was allowed to proceed until the solids content reached full conversion (~30% solids). The reactor was then charged with 1100 grams of styrene and 15 grams of pinane hydroperoxide. The reaction was allowed to proceed until 100% monomer conversion was attained at a solids content of about 32% at which point the polymerization was stopped by the addition of 44 grams of 15% active N-Isopropylhydroxylamine. The latex was degassed and steam stripped until the residual isoprene level was reduced to less than 500 parts per million (ppm).

The latex was then stabilized by the addition of about 1%, based upon the total weight of polymers, of a tri(mixed mono & dinonylphenyl)phosphite antioxidant. The latex was then coagulated in a solution containing 120 lbs (54.4 kg) of RO water and 4 lbs (1.8 kg) of sodium chloride which had been adjusted to a pH of 3.5 with sulfuric acid by slowly adding the latex to the water/salt solution. The coagulum was washed twice with RO water and dried at 60° C. (140° F.) in a forced air oven.

Example II

Preparation of Polyisoprene Control Sample Core

Particle B

A 2 gallon (7.57 liter) reactor equipped with two axial flow turbines operating at 220 rpm was evacuated for 30 minutes and then charged with a soap solution composed of 7.47 lbs (3.39 kg) of reverse osmosis (RO) water, 4.6 grams of tripotassium phosphate, 522 grams of a 10% solution of C14-18 unsaturated fatty acid potassium salt, 43.5 grams of a 20% solution of the potassium salt of disproportionated rosin acid, 9.52 grams of a 47.5% active dispersion of sodium naphthalenesulfonate-formaldehyde. The pH of the soap solution was adjusted to 10.5-11.0 with a 20% potassium hydroxide solution.

To the reactor was added an activator solution composed of 80 grams of RO water, 2.35 grams hydroxymethane-sulfinic acid monosodium salt dihydrate, and 0.69 grams of ethylenediaminetetraacetic acid, ferric sodium complex. Then, 1,454 grams of isoprene and 545 grams of 55% divinyl benzene were then added to the reactor. The reactor was cooled to 10° C. (50° F.). When the contents of the reactor reached 10° C. (50° F.), 5.45 grams of a 55% active pinane hydroperoxide was added. The reaction was allowed to proceed until 100% conversion of the monomer at about 30% solids and stopped by addition of 8 grams of 15% active N-Isopropylhydroxylamine. The latex was degassed and steam stripped until the residual isoprene level was less than 500 parts per million (ppm).

To the latex was added about 1% of total weight of polymers tri(mixed mono & dinonylphenyl)phosphite antioxidant. The latex was then coagulated in a solution of 60 lbs RO water at ~70° C. (~158° F.) and 2 lbs (0.907 kg) sodium chloride with the solution pH adjusted to 3.5 with sulfuric acid by slowly adding the latex to the water/salt solution. The coagulum was washed twice with RO water and dried at 60° C. (140° F.) in a forced air oven.

Example III

Preparation of Polystyrene Reinforced Polyisoprene Gels

PI-PS Core-Shell, Particle C

A 10 gallon (37.85 liter) reactor equipped with two axial flow turbines operating at 220 rpm was evacuated for 30 minutes and then charged with a soap solution composed of 41.6 lbs (18.87 kg) of reverse osmosis (RO) water, 24.8 grams of tripotassium phosphate, 6.21 lbs (2.82 kg) of a 10% solution of C14-18 unsaturated fatty acid potassium salt, 235 grams of a 20% solution of the potassium salt of disproportionated rosin acid, 51.4 grams of a 47.5% active dispersion of sodium naphthalenesulfonate-formaldehyde. The pH of the soap solution was adjusted to 10.5-11.0 with a 20% potassium hydroxide solution.

Then, 17.3 lbs (7.85 kg) of isoprene and 6.49 lbs (2.94 kg) of 55% divinyl benzene were then added to the reactor. The reactor was heated to 65° C. (149° F.). When the contents of the reactor reached 65° C. (149° F.), 17.3 grams of potassium persulfate dissolved in 432 grams of water was added. The reaction was allowed to proceed until the solids content reached full conversion (~30% solid). The reactor was then charged with 1080 grams of styrene and 1.73 grams of potassium persulfate dissolved in 43.2 grams of water. The reaction was allowed to proceed until 100% conversion of the monomer at about 32% solids and stopped by addition of 43.2 grams of 15% active N-isopropylhydroxylamine. The latex was degassed and steam stripped until the residual isoprene level was less than 500 parts per million (ppm).

To the latex was added about 1% of total weight of polymers tri(mixed mono & dinonylphenyl)phosphite antioxidant. The latex was then coagulated in a solution of 120 lbs (54.43 kg) RO water at ~70° C. (~158° F.) and 4 lbs (1.81 kg) sodium chloride with the solution pH adjusted to 3.5 with sulfuric acid by slowly adding the latex to the water/salt solution. The coagulum was washed twice with RO water and dried at 60° C. (140° F.) in a forced air oven.

Example IV

Preparation of Polyisoprene Control Sample Core

Particle D

A 10 gallon (37.85 liter) reactor equipped with two axial flow turbines operating at 220 rpm was evacuated for 30 minutes and then charged with a soap solution composed of 41.6 lbs (18.87 kg) of reverse osmosis (RO) water, 24.8 grams of tripotassium phosphate, 6.21 lbs (2.82 kg) of a 10% solution of C14-18 unsaturated fatty acid potassium salt, 235 grams of a 20% solution of the potassium salt of disproportionated rosin acid, 51.4 grams of a 47.5% active dispersion of sodium naphthalenesulfonate-formaldehyde. The pH of the soap solution was adjusted to 10.5-11.0 with a 20% potassium hydroxide solution.

Then, 17.3 lbs (7.85 kg) of isoprene and 6.49 lbs (2.94 kg) of 55% divinyl benzene were then added to the reactor. The reactor was heated to 65° C. (149° F.). When the contents of the reactor reached 65° C. (149° F.), 17.3 grams of potassium persulfate dissolved in 432 grams of water was added. The reaction was allowed to proceed until 100% conversion of the monomer at about 30% solids and stopped by addition of 43.2 grams of 15% active N-isopropylhydroxylamine. The latex was degassed and steam stripped until the residual isoprene level was less than 500 parts per million (ppm).

To the latex was added about 1% of total weight of polymers tri(mixed mono & dinonylphenyl)phosphite antioxidant. The latex was then coagulated in a solution of 120 lbs (54.43 kg) RO water at ~70° C. (158° F.) and 4 lbs (1.81 kg) of sodium chloride with the solution pH adjusted to 3.5 with sulfuric acid by slowly adding the latex to the water/salt solution. The coagulum was washed twice with RO water and dried at 60° C. (140° F.) in a forced air oven.

Example V

Compounded Properties of Modified PI Gels

Particles A, B, C and D were evaluated in a formula containing 100 phr SBR 1502, 50 phr carbon black and a standard sulfur cure package. All the results are listed in Table 1. The polystyrene modified particles (particle A versus particle B) clearly showed improved mechanical properties (G' at 1% and 300% modulus) and trouser tear property. The particles synthesized under hot conditions at 50° C. (122° F.) also showed some improvement over particles obtained under cold conditions at 10° C. (50° F.) (particle D vs. particle B). All the samples were cured at 160° C. (320° F.) for 30 minutes.

TABLE 1

|  | Control | Particle A | Particle B (reference) | Particle C | Particle D (reference) |
|---|---|---|---|---|---|
| SBR 1502 | 100 | 100 | 100 | 100 | 100 |
| CB | 50 | 50 | 50 | 50 | 50 |
| PARTICLE A | 0 | 25 | 0 | 0 | 0 |
| PARTICLE B | 0 | 0 | 25 | 0 | 0 |
| PARTICLE C | 0 | 0 | 0 | 25 | 0 |
| PARTICLE D | 0 | 0 | 0 | 0 | 25 |
| SANTOFLEX 13 AO | 2 | 2 | 2 | 2 | 2 |
| STEARIC ACID | 3 | 3 | 3 | 3 | 3 |
| ZINC OXIDE | 3 | 3 | 3 | 3 | 3 |
| NON-PRODUCTIVE | 158 | 183 | 183 | 183 | 183 |
| NON-PRODUCTIVE | 158 | 183 | 183 | 183 | 183 |
| SULFUR | 1.5 | 1.6 | 1.6 | 1.6 | 1.6 |
| TBBS | 0.7 | 0.75 | 0.75 | 0.75 | 0.75 |
| PRODUCTIVE | 160.2 | 185.35 | 185.35 | 185.35 | 185.35 |
| RPA - Test 505 (160° C., 30 min) | | | | | |
| G' @ 1% Strain (1 Hz, KPa)) | 2305 | 2130 | 1941 | 2292 | 2189 |
| G' @ 10% Strain (1.0 Hz, KPa) | 1414 | 1470 | 1399 | 1549 | 1552 |
| G' @ 50% Strain (1 Hz, KPa) | 955 | 1043 | 1039 | 1081 | 1128 |
| Tan D @ 10% Strain (1.0 Hz.) | 0.17 | 0.15 | 0.14 | 0.15 | 0.14 |
| T90 (min) | 18.14 | 19.62 | 19.66 | 18.43 | 17.52 |
| Rheometer - MDR | | | | | |
| tc 90 (min) | 15.49 | 16.57 | 17.79 | 17.26 | 17.05 |
| Delta Torque (MD) | 15.4 | 16.8 | 15.5 | 16.5 | 17.0 |
| Ring Tensile (ASTM D412, DIN 53504) | | | | | |
| 100% Modulus (MPa) | 2.3 | 2.7 | 2.7 | 2.8 | 2.8 |
| 200% Modulus (MPa) | 5.1 | 5.3 | 5.4 | 5.6 | 5.6 |
| 300% Modulus (MPa) | 11.1 | 10.6 | 10.6 | 11.2 | 11.4 |

TABLE 1-continued

|  | Control | Particle A | Particle B (reference) | Particle C | Particle D (reference) |
|---|---|---|---|---|---|
| Break Strength (MPa) | 24.4 | 20.2 | 19.6 | 19.9 | 19.5 |
| Elongation @ break (%) | 509 | 471 | 460 | 465 | 444 |
| Hardness RT | 74 | 78 | 74 | 80 | 77 |
| Hardness 100 C | 61 | 63 | 63 | 64 | 64 |
| Rebound @ RT (%) | 41 | 29 | 37 | 30 | 31 |
| Rebound @ 100 C (%) | 49 | 51 | 54 | 50 | 52 |
| Delta Rebound | 8 | 23 | 17 | 20 | 22 |
| Strebler Adhesion |  |  |  |  |  |
| Steady State Average Load (RT, N) | 135 | 138 | 121 | 140 | 122 |
| Steady State Average Load (95C, N) | 168 | 126 | 128 | 126 | 110 |
| Mooney - Aged - 1 day |  |  |  |  |  |
| ML4 @ 1 day | 93 | 76 | 79 | 81 | 79 |
| Din Abrasion - Original |  |  |  |  |  |
| Density (mg/mm$^3$) | 1.132 | 1.104 | 1.095 | 1.104 | 1.1 |
| Rel Volume Loss (mm$^3$) | 91 | 122 | 103 | 104 | 126 |
| Tear Strength |  |  |  |  |  |
| Tear Strength, ppi (Die C, N/mm) | 55.0 | 46.5 | 48.6 | 46.8 | 48.4 |
| Tear Strength, ppi (Trouser, N/mm) | 16.1 | 16.0 | 10.4 | 14.7 | 14.5 |

As is apparent from the data of Table 1, the rubber compositions containing gel particle A to D show significant increase in delta rebound, in comparison with the control compound. In addition, the tear properties were significantly increased in the case of compounds with modified PI gel particle A and C with core-shell structure, while compounds with reference particle B and D deteriorate the tear properties remarkably.

Example VI

Compounded Properties of Modified SBR Gels

A series of polystyrene modified SBR gels were synthesized using similar procedures described in Example 1 and 3. The core and shell compositions are listed in Table 2. All the samples are cured at 160° C. (320° F.) for 30 minutes. The compounded properties are shown in Table 3. Similar trend is observed in Table 3 that modified SBR gels provided enhancement in delta rebound and tear strength.

TABLE 2

|  | Core | | | Shell | Tg (° C.) |
|---|---|---|---|---|---|
| Sample | Butadiene | Styrene | DVB | Styrene |  |
| Particle E (%) | 50 | 50 | 10 | 0 | −5 |
| Particle F (%) | 60 | 40 | 18 | 10 | −5 |
| Particle G (%) | 50 | 50 | 7 | 10 | −13 |
| Particle H (%) | 50 | 50 | 10 | 10 | 0 |

TABLE 3

|  | Control | Particle E (Reference) | Particle F | Particle G | Particle H |
|---|---|---|---|---|---|
|  | 4002 | 4006 | 4008 | 4009 | 4010 |
| SBR 1502 | 100 | 100 | 100 | 100 | 100 |
| CB 805 | 50 | 50 | 50 | 50 | 50 |
| PARTICLE E | 0 | 25 | 0 | 0 | 0 |
| PARTICLE F | 0 | 0 | 25 | 0 | 0 |
| PARTICLE G | 0 | 0 | 0 | 25 | 0 |
| PARTICLE H | 0 | 0 | 0 | 0 | 25 |
| SANTOFLEX 13 AO | 2 | 2 | 2 | 2 | 2 |
| STEARIC ACID | 3 | 3 | 3 | 3 | 3 |
| ZINC OXIDE | 3 | 3 | 3 | 3 | 3 |
| NON-PRODUCTIVE | 158 | 183 | 183 | 183 | 183 |
| NON-PRODUCTIVE | 158 | 183 | 183 | 183 | 183 |
| SULFUR | 1.5 | 1.5 | 1.5 | 1.5 | 1.5 |
| TBBS | 0.7 | 0.7 | 0.7 | 0.7 | 0.7 |
| PRODUCTIVE | 160.2 | 185.2 | 185.2 | 185.2 | 185.2 |
| RPA - Test 505 (cured at 160° C.) |  |  |  |  |  |
| G' @ 1% Strain (1 Hz, KPa) | 2053 | 1837 | 1947 | 1708 | 1812 |
| G' @ 10% Strain (1 Hz, KPa) | 1263 | 1279 | 1389 | 1205 | 1276 |
| G' @ 50% Strain (1 Hz, KPa) | 834 | 903 | 950 | 891 | 909 |
| Tan D @ 10% Strain (1 Hz, KPa) | 0.17 | 0.14 | 0.14 | 0.14 | 0.14 |
| Rheometer - MDR |  |  |  |  |  |
| tc 90 (min) | 16.1 | 19.8 | 19.6 | 20.0 | 20.0 |

TABLE 3-continued

|  | Control | Particle E (Reference) | Particle F | Particle G | Particle H |
|---|---|---|---|---|---|
| Delta Torque (MD) | 14.8 | 14.7 | 15.5 | 13.7 | 14.8 |
| Ring Tensile (ASTM D412, DIN 53504) | | | | | |
| 100% Modulus (MPa) | 2.0 | 2.3 | 2.5 | 2.2 | 2.4 |
| 200% Modulus (MPa) | 4.5 | 4.3 | 4.5 | 4.1 | 4.5 |
| 300% Modulus (MPa) | 9.9 | 8.7 | 9.0 | 8.4 | 9.2 |
| Break Strength (MPa) | 23.7 | 20.3 | 20.1 | 19.4 | 20.1 |
| Elongation @ break (%) | 519 | 515 | 508 | 504 | 501 |
| Hardness RT | 72 | 75 | 78 | 71 | 76 |
| Hardness 100 C | 60 | 60 | 62 | 59 | 61 |
| Rebound @ RT (%) | 41 | 28 | 31 | 30 | 27 |
| Rebound @ 100 C (%) | 49 | 51 | 50 | 52 | 52 |
| Delta Rebound | 8 | 24 | 19 | 22 | 24 |
| Strebler Adhesion | | | | | |
| Steady State Average Load (RT, N) | 154 | 141 | 154 | 132 | 144 |
| Steady State Average Load (95C, N) | 149 | 128 | 174 | 109 | 122 |
| Mooney - Aged - 1 day | | | | | |
| ML4 @ 1 day | 78 | 74 | 75 | 76 | 75 |
| Din Abrasion | | | | | |
| Density (mg/mm³) | 1.124 | 1.101 | 1.098 | 1.097 | 1.099 |
| Rel Volume Loss (mm³) | 97 | 115 | 120 | 101 | 116 |
| Tear Strength | | | | | |
| Tear Strength, ppi (Die C, N/mm) | 56.0 | 48.1 | 49.6 | 45.9 | 48.0 |
| Tear Strength, ppi (Die TR, N/mm) | 17.1 | 17.1 | 20.3 | 14.7 | 18.0 |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full-intended scope of the invention as defined by the following appended claims.

What is claimed is:

1. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (1) a filler, (2) a cured rubbery polymer, and (3) core-shell particles which are consisting essentially of (a) a crosslinked elastomeric core consisting of repeat units that are derived from isoprene monomer and from 15 weight percent to 30 weight percent divinyl benzene, based upon the weight of the crosslinked elastomeric core, wherein the crosslinked elastomeric core is a polymeric composition having a glass transition temperature which is within the range of −20° C. to 20° C., and (b) a polymeric shell which is derived from styrene monomer, wherein the polymeric shell has a glass transition temperature which is within the range of 50° C. to 160° C., wherein the glass transition temperature of the elastomeric core differs from the glass transition temperature of the polymeric shell by at least 30° C., and wherein the weight ratio of the core to the shell is within the range of 20:1 to 7:1.

2. The tire as specified in claim 1 wherein the core-shell particles are present in the tread at a level which is within the range of about 1 phr to about 50 phr.

3. The tire as specified in claim 1 wherein the core-shell particles are present in the tread at a level which is within the range of about 20 phr to about 30 phr.

4. The tire as specified in claim 2 wherein the divinyl benzene is present in the crosslinked elastomeric core at a level which is within the range of 15 weight percent to 25 weight percent, based upon the weight of the crosslinked elastomeric core.

5. The tire as specified in claim 4 wherein the rubbery polymer is styrene-butadiene rubber.

6. The tire as specified in claim 4 wherein the rubbery polymer is polybutadiene rubber.

7. The tire as specified in claim 1 wherein the glass transition temperature of the elastomeric core differs from the glass transition temperature of the polymeric shell by at least 50° c.

8. The tire as specified in claim 2 wherein the glass transition temperature of the elastomeric core differs from the glass transition temperature of the polymeric shell by at least 70° C.

9. The tire as specified in claim 8 wherein the weight ratio of the core to the shell is within the range of 12:1 to 8:1.

10. The tire as specified in claim 1 wherein the glass transition temperature of the elastomeric core differs from the glass transition temperature of the polymeric shell by at least 50° C.

11. The tire as specified in claim 1 wherein the glass transition temperature of the elastomeric core differs from the glass transition temperature of the polymeric shell by at least 70° C. and wherein the weight ratio of the core to the shell is within the range of 15:1 to 5:1.

12. The tire as specified in claim 2 wherein the shell is comprised of at least 75 weight percent repeat units that are derived from styrene.

13. The tire as specified in claim 3 wherein the shell is comprised of at least 85 weight percent repeat units that are derived from styrene.

14. The tire as specified in claim 1 wherein the filler is carbon black.

15. The tire as specified in claim 14 wherein the carbon black is present in an amount which is within the range of 5 phr to 100 phr.

16. The tire as specified in claim 15 wherein the carbon black has a surface area of at least 35 m$^2$/g.

17. The tire as specified in claim 1 wherein the filler is silica.

\* \* \* \* \*